Nov. 8, 1960 C. R. TAYLOR 2,958,886

PHONOGRAPH RECORD CLEANER

Filed Jan. 12, 1959 2 Sheets-Sheet 1

CLARENCE R. TAYLOR
INVENTOR.

BY Steve W. Grembau

ATTORNEY

CLARENCE R. TAYLOR
INVENTOR.

BY Steve W. Grembon
ATTORNEY 2,958,886
Patented Nov. 8, 1960

2,958,886

PHONOGRAPH RECORD CLEANER

Clarence R. Taylor, Rochester, N.Y.
(28 Woodside Drive, Penfield, N.Y.)

Filed Jan. 12, 1959, Ser. No. 786,333

20 Claims. (Cl. 15—124)

This invention relates generally to a cleaning device, and more specifically to a phonograph record cleaner.

A primary object of the present invention is to provide a device for protecting both phonograph records and needles from the abrasive action and scratching caused by particles of dust and dirt which collect on its surfaces, thus prolonging their life and usefulness.

Another object of the invention is to provide means for quickly and easily removing particles of dust and dirt simultaneously from both surfaces of a record.

Another object of the invention is to provide means for applying dampness to the cleaning action on both surfaces of a record to help in removing particles of dust and dirt which are attracted by the static electricity in the record.

Another object of the invention is to provide means in an attractive housing for cleaning dust and dirt from records.

A further object of the invention is to provide a device for cleaning records, which requires a very minimum of service.

Still another object of this invention is the provision of a device for cleaning records and the like that is of simple design and construction, thoroughly reliable and efficient in operation, and economical to manufacture.

With the foregoing and other objects in view, this invention comprises certain novel constructions, combinations, and arrangements of parts as will be hereinafter fully described, illustrated in the accompanying drawings, and more particularly pointed out in the appended claims.

Figure 1:
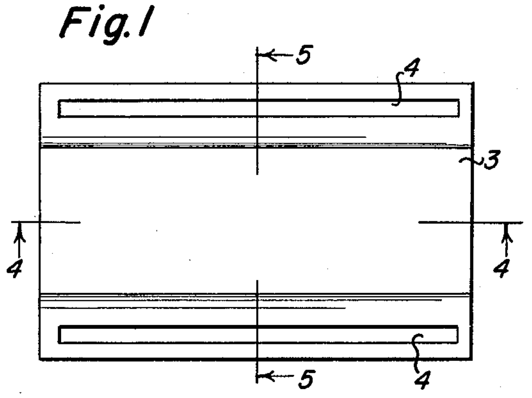
Fig. 1 is a top plan view of the exterior housing.
Figure 3:
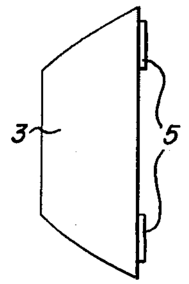
Fig. 3 is an end view of the exterior housing.
Figure 2:
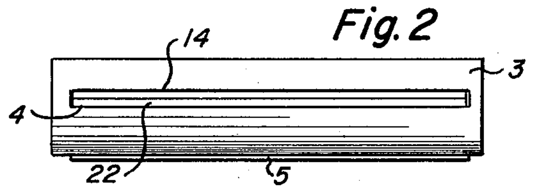
Fig. 2 is a side view of the exterior housing.
Figure 5:
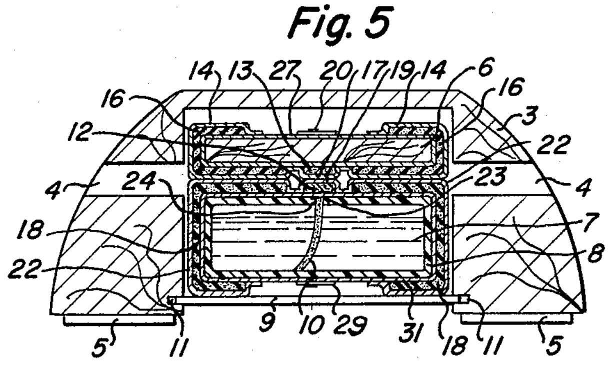
Fig. 5 is a central, vertical sectional view taken substantially on line 5—5 of Fig. 1 and looking in the direction of the arrows.
Figure 7:
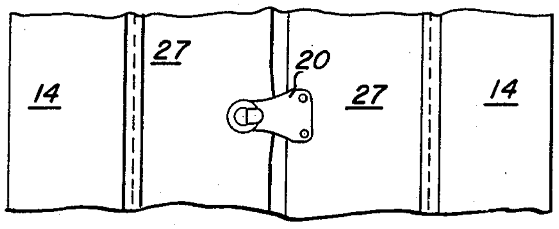
Fig. 7 is a partial plan view of the top surface of the upper floating wiper section shown in Figs. 5 and 6.

Referring to the drawings by numerals, 3 designates the exterior housing or casing which may be made of any suitable material such as wood or plastic and finished in any suitable way to provide an attractive as well as a useful phonograph record cleaner. On the bottom of housing 3 are located two non-skid pads 5 which effectively anchor the cleaning device on its support and prevent it from moving as records are pushed therethrough for cleaning same. On each side of the cleaner are openings 4, Figs. 1, 2 and 5, for entry and exit of a record which is cleaned by pushing the record between the upper and lower wiper sections shown best in Figs. 5, 6 and 8. A record may be passed through the cleaner in either direction to be effectively cleaned of dust and dirt particles.

Figure 6:
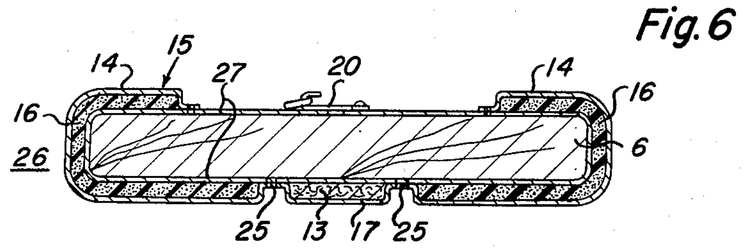
Fig. 6 is an enlarged view of the upper floating wiper section shown in Fig. 5.

The upper floating wiper section 26 shown in Fig. 6 comprises a bar 6 of suitable, substantially non-warping, material such as wood or plastic adapted to provide the right weight needed to get proper wiping action, and a wiping sleeve 15 which is securely fastened around bar 6 by several hook fasteners 20 shown in Figs. 4, 5, 6 and 7. The wiping sleeve 15 as best seen in Fig. 6 comprises a suitable base cloth 27 to which is sewn wiping cloths 14, a dampening cloth 17, and fasteners 20. The wiping cloths 14 and dampening cloth 17 may be separate cloths, or if desired may be formed from a single cloth. Retained between base cloth 27 and dampening or wetting cloth 17 is a dampening pad 13 which is made of felt or other suitable material adapted to effectively hold and distribute water throughout its thickness, width and length. The dampening cloth 17 may be any suitable soft cloth material adapted to transfer water from the dampening pad 13 to the record as it is passed in contact therewith. Retained between base cloth 27 and wiping cloths 14 are pads 16 which are made of any suitable sponge material to provide cushioning behind wiping cloths 14 to effect proper drying and wiping action on the record as it is passed in contact therewith. The wiping cloths 14 may be any suitable soft cloth material adapted to dry and wipe the record surface as it is passed in contact therewith.

At positions 25, Fig. 6, base cloth 27, dampening cloth 17 and wiping cloths 14 are all treated with any suitable commercially available water repellent chemical paste or cement material which prevents water from leaving the area where it is to be confined, namely within the dampening pad 13, the portion of base cloth 27 in contact therewith, and dampening cloth 17.

Figure 4:
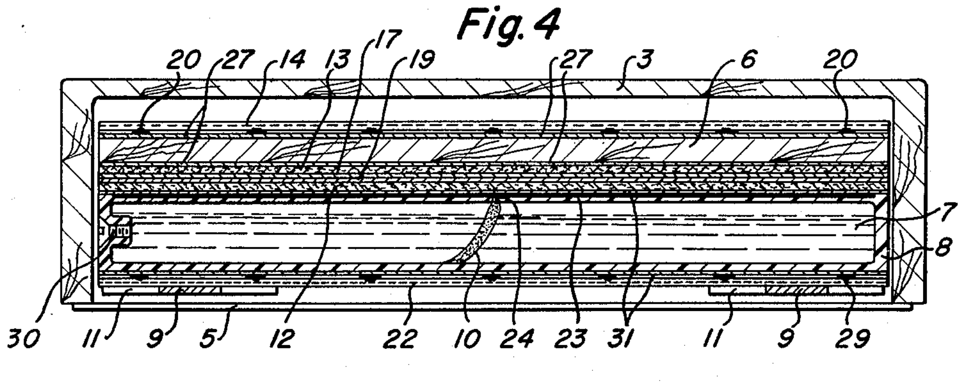
Fig. 4 is a central, vertical sectional view substantially taken on line 4—4 of Fig. 1 and looking in the direction of the arrows.
Figure 8:
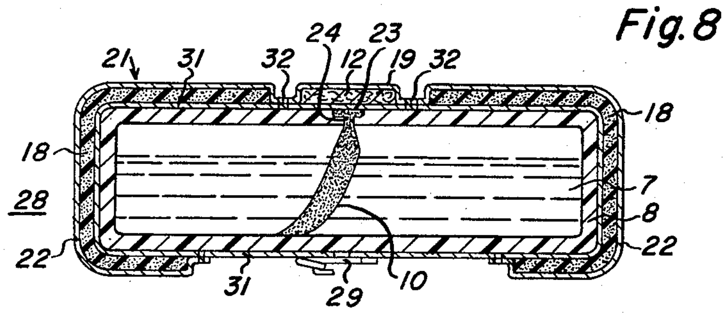
Fig. 8 is an enlarged view of the lower fixed wiper section shown in Fig. 5.
Figure 9:
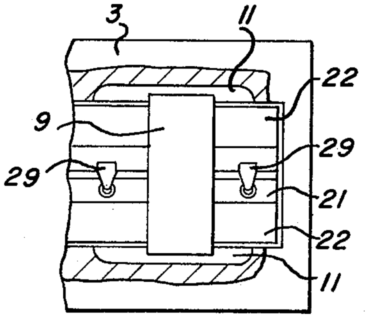
Fig. 9 is a partial bottom view of the exterior housing showing the method used to hold both wiper sections in the exterior housing.
Figure 10:
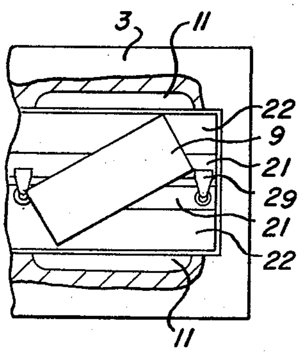
Fig. 10 is a partial bottom view of the exterior housing showing the retaining plate rotated out of its grooves for removal of both wiper sections.

The lower fixed wiper section 28 as best seen in Fig. 8 comprises a water container 8 of suitable non-corrosive material filled partially with any suitable cleaning liquid 7 such as water into which a liquid absorbing wick material 10 protrudes through a small hole 24. The wiper section 28 further comprises a wiping sleeve 21 similar to sleeve 15 which is securely fastened around container 8 by several hook fasteners 29 similar to fasteners 20 as shown in Figs. 4, 5, 8, 9 and 10, a distribution wick 23 connected to wick 10 as best seen in Figs. 4 and 8 made of suitable liquid absorbing material, and a water inlet port and seal 30 as seen in Fig. 4. The wick 10 and distribution wick 23 may be formed separately or as a unitary wick member. The wiping sleeve 21 comprises a suitable base cloth 31 to which is sewn dampening or wetting cloth 19, wiping cloths 22, and fasteners 29. Although the dampening cloth 19 and wiping cloths 22 are shown as separate cloths, they conceivably could be formed from a single cloth. Retained between base cloth 31 and dampening cloth 19 is a dampening pad 12 which is made of felt or other suitable material adapted to effectively hold and distribute water throughout its thickness, width and length. The dampening cloth 19 preferably includes any suitable soft cloth material adapted to transfer water from dampening pad 12 to the record as it is passed in contact therewith. Retained between base cloth 31 and wiping cloths 22 are pads 18, formed of any suitable sponge material to provide cushioning behind wiping cloths 22 to effect proper drying and wiping action on the record as it is passed in contact therewith. The wiping cloths 22 preferably include any suitable soft cloth material adapted to dry and wipe the record surface as it is moved in contact therewith.

At positions 32 in Fig. 8, base cloth 21, dampening cloth 19 and wiping cloths 22 are all treated with the same water retarding chemical material applied at 25 which prevents water from leaving the area where it is to be confined, namely within the dampening pad 12, the portion of base cloth 31 in contact therewith, and dampening cloth 19.

Dampening water is transferred by the wick 10, Fig. 8, from the water container 8 to the distribution wick 23 and subsequently to all parts of the dampening pads 12 and 13 as well as the dampening cloths 17 and 19 since upper floating wiper sections 26 and lower fixed wiper section 28 remain in intimate contact until a record is passed between the sections. In this way the record is both dampened and wiped on both sides. Furthermore the record may be passed through the cleaning device in either direction with the same cleaning action taking place. The amount of dampening desired is obtained by controlling the size of the wick hole 24 and wick 10 therein which size also helps to conserve the water supply to provide long service.

For water replenishment and/or servicing, both upper and lower wiping sections 26, 28 respectively are easily removed by turning retaining plates 9 as best seen in Figs. 4, 5, 9 and 10, out of grooves 11 so that the wiping sections can be removed through the bottom of the wiper housing 3. In normal working position, upper and lower wiping sections 26, 28 rest on retaining plates 9, which hold them in the housing 3 and in the correct position within the housing so that the line of separation between them is substantially at the center of the record entry and exit openings 4.

As hereinbefore indicated the cleaning device is placed conveniently on a table or desk to provide means for easily and quickly cleaning dust and dirt particles from records or the like, even the particles retained in the record by static charge. They are simply pushed into any one opening 4 of the housing and out of the other opening 4 passing between the two wiping sections 26, 28 which simultaneously cleans both surfaces of the record.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claims.

What I claim is:

1. In a device for cleaning phonograph records and the like, the combination comprising: a fluid container; first cleaning means for cleaning one side of a record, said first cleaning means encircling said container and including a first wetting portion; fluid conveying means carried by said container and having a first portion thereof disposed in a fluid in said container, and a second portion thereof in contact with said first wetting portion for conveying said fluid from said container to said first wetting portion; and second cleaning means for cleaning the other side of said record, said second cleaning means disposed above and in register with said first cleaning means and bearing thereon in the absence of a record with a force substantially equal to the weight of said second cleaning means and receiving fluid from said first wetting portion while in contact therewith whereby both sides of a record that is manually transported between said first and second cleaning means are cleaned thereby.

2. The invention according to claim 1 wherein said first cleaning means comprises a first wiping portion adjacent said first wetting portion, and said second cleaning means comprises a second wiping portion in register with said first wiping portion and a second wetting portion in register with said first wetting portion.

3. The invention according to claim 2 wherein said first cleaning means includes first barrier means for confining fluid to said first wetting portion thereby preventing said first wiping portion from being wet by said first wetting portion, and said second cleaning means includes second barrier means for confining fluid to said second wetting portion thereby preventing said second wiping portion from being wet by said second wetting portion.

4. The invention according to claim 3 wherein said first and second barirer means comprises a suitable water repellent chemical material for impregnating said first and second cleaning means between said first wetting and wiping portions and between said second wetting and wiping portions.

5. The invention according to claim 2 wherein said first and second wiping means comprises a sponge rubber pad, and said first and second wetting means comprises a fluid adsorbent pad.

6. The invention according to claim 1 wherein said first cleaning means comprises a first sleeve removably secured to said container, said first sleeve having a first wiping portion spaced apart from said first wetting portion, and said second cleaning means comprises a support member, a second sleeve removably secured to said support member, said second sleeve having a second wetting portion in register with said first wetting portion and a second wiping portion in register with said first wiping portion.

7. The invention according to claim 6 wherein said first sleeve is wrapped around said container and has fastening means for removably securing said first sleeve to said container, and said second sleeve is wrapped around said support member and has fastening means for removably securing said second sleeve to said support member.

8. The invention according to claim 6 wherein each of said first and second sleeves comprises a base cloth, a wetting cloth secured to said base cloth, a wiping cloth secured to said base cloth, said wetting portion of each sleeve comprises a fluid absorbent pad interposed between said base cloth and said wetting cloth, and said wiping portion of each sleeve comprises a sponge rubber pad interposed between said base cloth and said wiping cloth.

9. In a device for cleaning phonograph records and the like, the combination comprising: a container for cleaning fluid; spaced apart first wiping means carried by said container; a first wetting means carried by said container in a position interposed between said first wiping means; fluid conveying means for conveying said fluid from said container to said first wetting means; a support member disposed above and in register with said container; spaced apart second wiping means carried by said support member in register with and facing said first wiping means; a second wetting means interposed between said second wiping means and carried by said support member in register with and facing said first wetting means and receiving fluid therefrom when in contact therewith, said second wiping means and said second wetting means bearing upon said first wiping means and said first wetting means respectively in the absence of a record with a force substantially equal to the weight of said support member whereby both sides of a record that is manually transported therebetween are dampened by said first and second wetting means and wiped by said first and second wiping means.

10. In a device for cleaning phonograph records and the like, the combination comprising: a housing having a cavity and oppositely disposed openings connected to said cavity; first cleaning means disposed in said cavity for cleaning one side of a record, said first cleaning means including a first wetting portion, a container, and a fluid conveying means for conveying a fluid from said container to said first wetting portion; retaining means for holding said first cleaning means in said cavity; and second cleaning means disposed in said cavity above and in register with said first cleaning means for cleaning the other side of said record and bearing on said first cleaning means in the absence of a record with a force substantially equal to the weight of said second cleaning means and receiving fluid from said first wetting portion while in contact therewith, the line of separation between said first and second cleaning means being in register with said openings whereby both sides of a record that is manually transported through said openings and between said first and second cleaning means are cleaned thereby.

11. The invention according to claim 10 wherein said first cleaning means comprises a first sleeve removably secured to said container, said first sleeve having a first wiping portion adjacent said first wetting portion, and said second cleaning means comprises a support member, a second sleeve removably secured to said support member, said second sleeve having a second wetting portion in register with said first wetting portion and a second wiping portion in register with said first wiping portion.

12. The invention according to claim 10 wherein said first sleeve is wrapped around said container and has fastening means for removably securing said first sleeve to said container, and said second sleeve is wrapped around said support member and has fastening means for removably securing said second sleeve to said support member.

13. The invention according to claim 10 wherein each of said first and second sleeves comprises a base cloth, a wetting cloth secured to said base cloth, a wiping cloth secured to said base cloth, said wetting portion of each sleeve comprises a fluid absorbent pad interposed between said base cloth and said wetting cloth, and said wiping portion of each sleeve comprises a sponge rubber pad interposed between said base cloth and said wiping cloth.

14. The invention according to claim 10 wherein said first cleaning means comprises a first sleeve removably secured to said container, said first sleeve having spaced apart first wiping portions and a first wetting portion interposed between said first wiping portions, and said second cleaning means comprises a support member, a second sleeve removably secured to said support member, said second sleeve having spaced apart second wiping portions in register with said first wiping portions and a second wetting portion interposed between said second wiping portion and in register with said first wetting portion.

15. The invention according to claim 14 wherein said first sleeve is wrapped around said container and has fastening means for removably securing said first sleeve to said container, and said second sleeve is wrapped around said support member and has fastening means for removably securing said second sleeve to said support member.

16. The invention according to claim 14 wherein each of said first and second sleeves comprises a base cloth, a wetting cloth secured to said base cloth, wiping cloths secured to said base cloth, said wetting portion of each sleeve comprising a fluid absorbent pad interposed between said base cloth and said wetting cloth, and said wiping portions of each sleeve each comprise a sponge rubber pad interposed between said base cloth and one of said wiping cloths.

17. The invention according to claim 1 wherein said fluid conveying means comprises a wick.

18. The invention according to claim 17 wherein said wick is substantially T-shaped with a portion thereof supported by said container adjacent said first wetting portion, and the remainder of said wick extending into the fluid in said container.

19. The invention according to claim 9 wherein said fluid conveying means comprises a wick.

20. The invention according to claim 19 wherein said wick is substantially T-shaped with a portion thereof supported by said container adjacent said first wetting portion, and the remainder of said wick extending into the fluid in said container.

References Cited in the file of this patent

UNITED STATES PATENTS

| | | |
|---|---|---|
| 1,871,998 | Jennings | Aug. 16, 1932 |
| 2,488,334 | Schryner | Nov. 15, 1949 |
| 2,809,385 | Griffeth et al. | Oct. 15, 1957 |